Dec. 9, 1952    A. PERROT    2,620,682
EXTENSIBLE CRANK FOR MOTION-PICTURE CAMERAS
Filed Oct. 31, 1950    2 SHEETS—SHEET 1

Inventor
Arnold Perrot
by Karl Lichotin
Aty.

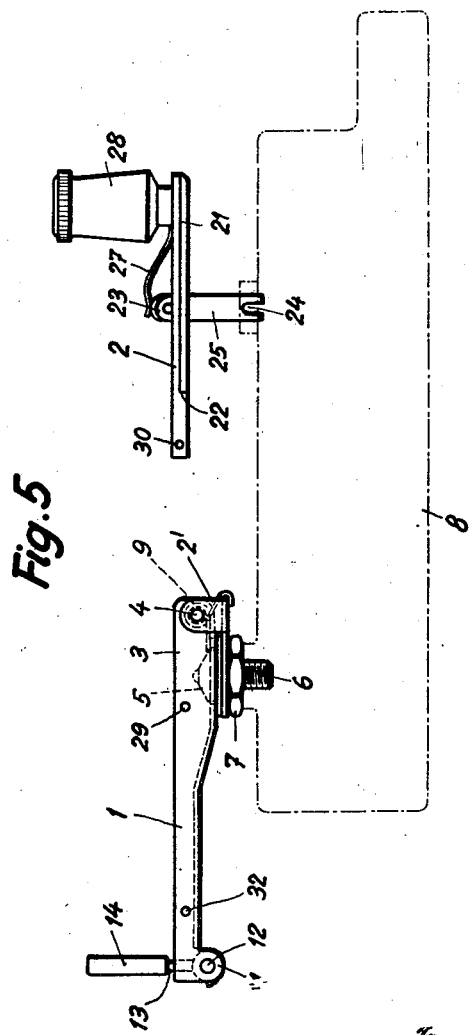

Patented Dec. 9, 1952

2,620,682

UNITED STATES PATENT OFFICE 2,620,682

EXTENSIBLE CRANK FOR MOTION-PICTURE CAMERAS

Arnold Perrot, Nidau, Switzerland

Application October 31, 1950, Serial No. 193,108
In Switzerland November 5, 1949

3 Claims. (Cl. 74—547)

This invention relates to crank mechanism of the kind used for instance in connection with motion picture cameras.

In many motion picture cameras now on the market, the cranks for winding the spring mechanisms, if made sufficiently long to render winding convenient, are bound to be interfered with by the lens revolver, in certain positions of the latter. To obviate this drawback, some cameras now carry extensible cranks where the extension is pushed back, and the length of the crank is correspondingly shortened, whenever the lens revolver would interfere with the crank as extended.

It is an object of the present invention to further improve the winding mechanism of a motion picture camera by providing an extensible crank part which is also detachable so it may serve as an auxiliary crank, for example, for manual winding of the film, thus eliminating the extra crank previously required, for example for the back and forth winding of the film in the blending over procedure common with trick films.

A further object of this invention is to provide a non-detachable crank part which, should the detachable crank portion get lost, may be converted into an emergency crank.

Other objects, and the manner in which the same are attained, will become apparent as this specification proceeds.

In the drawing accompanying this specification and forming part thereof, one embodiment of the invention is illustrated diagrammatically by way of example.

In the drawing,

Fig. 5 shows the non-detachable part of the crank set up as an emergency crank, and the detachable part mounted to serve as crank for manual winding, both in working position.

Figure 1:
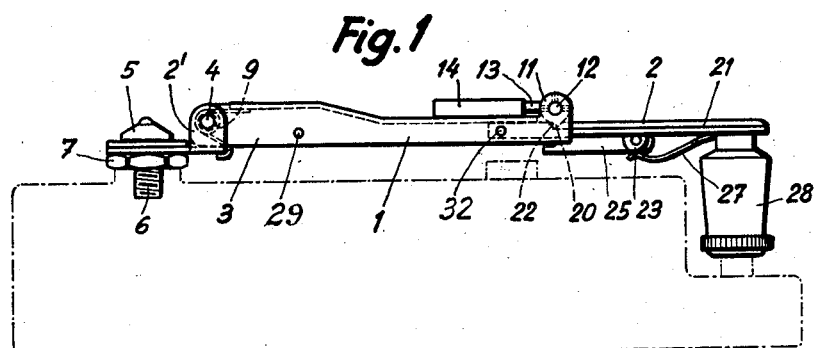
Fig. 1 is a side view of the extended crank in its position of rest.

Referring now to the drawing, the crank comprises a non-detachable part 1, and a detachable extension 2. The part 1 has a U-shaped section. At one end of the part 1, a mounting part $2^1$ is pivoted to the flange 3 of the U-shaped part 1 by a pivot 4. A driver 5 is mounted, by means of a screw bolt 6, for free rotation in the mounting part $2^1$, and is secured in axial direction by means of a screw nut 7. The part of the screw bolt 6 projecting beyond the nut 7, is screwed counter-clockwise into the winding shaft of the spring mechanism of the camera 8. A helical spring 9 is wound on the pivot shaft 4, one end of the spring abutting against part $2^1$ while the other abuts against the non-detachable crank part 1. This spring tends to turn the mounting part $2^1$ clockwise from the position shown in Fig. 1, into the position shown in Fig. 2. The non-detachable part 1, the flanges 3 of which are bent at their free ends at 10, forms a sliding guide for the detachable part 2. On the far side relative to the mounting part $2^1$, of part 1, two lugs 11 support a shaft 12 on which a link 13 is mounted for free rotation. The link 13 mounts a flat handle 14 which is free to rotate relative to the link 13; in case the non-detachable part 1 must serve as an emergency crank, the handle 14 may be turned into a position at right angles relative to the part 1. On each of its faces 15 adjoining the lugs 11, the link 13 has a cam 16 which may engage various recesses 17 in the lugs 11 in various predetermined positions. In order that the cams 16 may disengage themselves from the recesses 17, the part 1 has a slot 18 which extends to the far end relative to the mounting part $2^1$, of the part 1. The presence of the slot 18 results in the creation, on part 1, of two resilient portions 19, which yield under the influence of the cams 16 when the part 13 is turned so as to permit the cams 16 to leave the recesses 17. As soon as the cams 16 approach another pair of recesses, the resilient portions 19 approach one another so as to permit the cams 16 to enter into these new recesses. The link 13, on the faces 15 adjoining the lugs 11, also mounts radially projecting cams 20 which serve as stops for the extensible part 2 when in its extended position. The cams 20 may be caused to disengage the part 2, by a turn of the handle 14 and the associated link part 13, so as to clear the way for a complete detachment of the crank extension part 2 from the non-detachable crank part 1. For the same general purpose, the extension part 2, over the greater part of its length and on both sides, has a shoulder 21 the inner edge 22 of which is designed to be engaged by the cams 20, in the position of parts 13 and 14 shown in Fig. 1, so as to prevent detachment of the extension part 2 from the non-detachable part 1 of the crank.

Lugs 23 on the extensible part 2 mount for rotation, a coupling member 25 having a groove 24, which in the position shown in Fig. 1, rests in a cut-out 26 in the part 1, to be maintained in this position—in which it is aligned with the longitudinal axis of the extensible part 2—by a leaf spring 27 mounted on the part 2 and resting on the coupling member 25. If the coupling member 25 is turned from the position parallel to that of part 2 (shown in Fig. 1) to a position at right angles relative to part 2 (shown in Fig. 5), the leaf spring 27 again tends to maintain the member 25 in its new position. With part 2 in extended position, the coupling member 25 rests on a supporting portion of part 13 and, thus, cannot turn.

On its outer end the extensible part 2 mounts, for rotation, a handle 28; near the other end, the part 2 has bores 29 and movable therein, two small pistons 30 which are yieldably forced into the bores by a spring 31 so as to project from the bores upon displacement of the extensible part 2 back into the part 1, e. g. toward the left in Fig. 1. The part 1 has apertures 32 which engage the pistons 30 in the inner position (shown in dot and dash lines in Fig. 2) of the extensible part 2, to prevent displacement thereof. The stop action of the pistons 30 may be eliminated, and movability restored to the part 2, by a pull on the crank handle 28.

Figure 2:
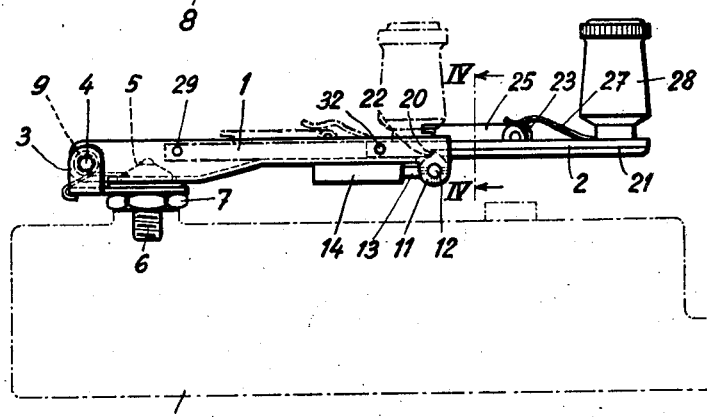
Fig. 2 is a side view of the extended crank in working position.
Figure 3:
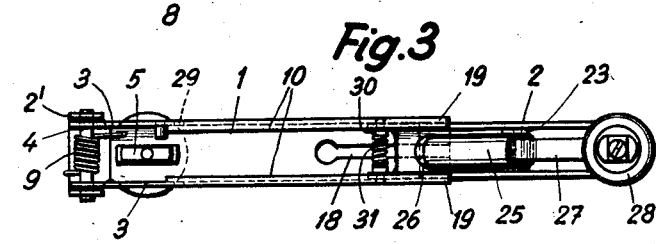
Fig. 3 is a plan view of the crank in the position shown in Fig. 2.
Figure 4:
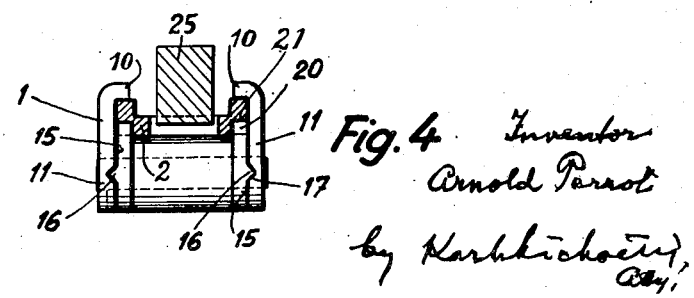
Fig. 4 is a section along the line IV—IV in Fig. 2.

Fig. 1 shows the crank in its position of rest occupied when the camera is placed into its case. In order to place the crank into working position, it is turned first counter-clockwise (in Fig. 1) about the shaft 4, and then about the axis of the screw 6 until the driver 5 enters the corresponding slot in the part 1. The working position thus obtained is shown in Fig. 2. If the crank now is turned counter-clockwise, the part 1 carries along the driver 5, and the spring of the camera is wound.

Fig. 2 shows the part 2 in its extended position. If the lens revolver is in a position such that it would interfere with the turning of the crank, the extensible part 2 is pushed back into the non-extended position shown in dot and dash lines in Fig. 2. The pistons 30 jump out of the bores 29 to engage, in the innermost position of the part 2, the apertures 32. The effective length of the crank is now reduced to a point where the crank may be turned without further interference on the part of the lens revolver.

If it is desired to wind the film by hand back and forth, i. e. to employ for blending over purposes the one-, eight-, sixteen-, twenty-four etc. step procedure, the handle 14 is shifted from the position shown in Figs. 1 and 2, into the position at right angles to the longitudinal axis of the crank. This results in the cams 20 moving out of range of the abutments 22 on the shoulders 21 so the part 2 can be entirely detached from the part 1. Now the coupling member 25 is turned into the position at right angles to part 2, shown in Fig. 5, and is coupled with the shaft on the camera, for the manual back and forth winding of the film (Fig. 5). Thus the part 2 may be used as an independent crank, which eliminates the need for an additional crank for manual winding. Moreover, in case the extension part 2 should get lost, the handle 14 may be turned into the position at right angles to the longitudinal axis of part 1 so this part may serve as an emergency crank.

I wish it to be understood that various changes within the scope of the appended claims may be made in the construction, design and mode of operation shown and described, without departing from the spirit of the invention or sacrificing any advantages thereof.

I claim:

1. In a crank mechanism in combination, a shaft, a crank arm linked to said shaft for oscillation about an axis extending at right angles to the shaft axis, a holdable crank handle linked to the free end of said crank arm for oscillation about an axis also extending at right angles to said shaft axis, an extension member guided on said crank arm and a second crank handle on the free end of said extension member, said foldable crank handle in folded position forming a check for said extension member preventing it from becoming disengaged from said guiding arm.

2. The mechanism of claim 1 in combination with a coupling arm hinged to the extension member for oscillation across a slot in said extension member, said coupling arm being formed with a slotted end serving for engaging a correspondingly formed shaft end.

3. The mechanism of claim 1, in which the crank arm has a channel form and a forked end formed with grooves, the foldable crank handle being hinged to the resilient arms of said forked end and key-and-slot means on the contacting walls of the hinged parts serving for arresting said handle in active position at right angles to said arm.

ARNOLD PERROT.

REFERENCES CITED

The following references are of record in the file of this patent:

UNITED STATES PATENTS

| Number | Name | Date |
|--------|------|------|
| 250,165 | Palmer | Nov. 29, 1881 |
| 1,999,457 | Hoehn | Apr. 30, 1935 |
| 2,455,819 | Smith | Dec. 7, 1948 |